3,146,267
PRODUCTION AND DECOLORIZATION OF QUATERNARY AMMONIUM COMPOUNDS

Robert Weinstein, Flushing, N.Y., and Ira Rose, Millburn, and Ramsey Christian, Newark, N.J., assignors to Nopco Chemical Company, Newark, N.J., a corporation of New Jersey
No Drawing. Filed Mar. 3, 1961, Ser. No. 93,017
10 Claims. (Cl. 260—567.6)

This invention relates to a method of producing substituted ammonium salts of improved color. More specifically, the invention relates to a process of inhibiting the formation of color in the production of substituted ammonium salts.

The substituted ammonium salts of this invention may be amine salts of primary, secondary and tertiary amines, amine acid addition salts and quaternary ammonium salts. Quaternary ammonium salts are widely used in the paper, textile, dye and other industries as surfactants. They are produced by reacting a tertiary amine with a quaternizing agent. These compounds possess a positive charge on the nitrogen atom and are attracted to the negatively charged surfaces of paper, textiles and other fibrous materials, and as a result have found widespread use in the textile, paper, and chemical industries as surfactants, dispersants and emulsifiers. In many of the fields in which quaternary ammonium salts are used, it is necessary that they be free from discoloration in order to avoid adverse effects upon the product to which they are applied.

When many quaternary ammonium salts, especially quaternary ammonium salts which contain fatty groups, are produced by the prior art methods they are often dark and discolored. What actually is responsible for the discoloration is still not certain. There are many theories as to why color is found in quaternary ammonium salts and attempts have been made to determine the nature of the color. One theory advanced is that color is probably due to different color forming bodies which are usually small amounts of oxidized material derived from unsaturated bodies dissolved in the amine material used in preparing these salts. These color forming bodies are often insufficiently removed from the amine starting material even though the material may have been treated for color removal.

Another theory advanced as to why color exists in quaternary ammonium salts is that there are latent color bodies present in the amines used to prepare the quaternary ammonium salts. Even though the amines may have been treated to remove visible color bodies, latent color bodies present in these amines and which are initially colorless, will, on exposure to air, light, heat or other atmospheric influences, markedly discolor the amine material. Still another theory is that color develops even though the starting amines have been treated to remove color, the color being due to some unknown reaction mechanism which occurs during quaternization. Thus, what actually is responsible for the color in quaternary ammonium salts is still uncertain, and the fact remains that the unwanted color does develop in the final quaternary ammonium salt product, notwithstanding how or why color develops.

The problem of eliminating the color from quaternary ammonium salts is a long standing one in the art as indicated above. Conventional treatments, e.g., recrystallization, charcoal treatment, etc. which are often employed for removal of color may bring about improvement. However, these procedures are frequently time-consuming and uneconomical for application to the preparation of low cost fatty quaternary ammonium compounds. Often in the case of recrystallization the color of the salts may revert to the original. For example, quaternary ammonium iodides can darken on exposure to air even during purification due to the oxidation of iodide ion to iodine. Hence, in many instances, it was necessary to further treat the quaternary ammonium salts even after these salts were purified and/or stabilized.

As indicated above, the procedures presently employed to obtain colorless quaternary ammonium salts from discolored materials have been very costly, laborious, and in many cases, ineffective. An important use of these products have been as surface active agents in the textile and paper industries wherein discoloration must be avoided in order for the products so treated to be usable. Therefore it will be appreciated that colorless quaternary ammonium salts are required for industry.

Similar difficulties regarding undesirable color are also encountered in the alkylation of primary and secondary amines when quaternizing agents are employed as the alkylation agent in such alkylations.

It is therefore an object of this invention to provide a new and useful method of producing substituted ammonium salts with improved color.

It is also an object of this invention to provide a new and useful method of inhibiting formation of color in the production of substituted ammonium salts.

It is a further object of this invention to provide a new and useful method of producing quaternary ammonium salts of improved color.

It is a further object of this invention to provide a new and useful method of inhibiting the formation of color in the production of quaternary ammonium salts.

Other objects of this invention will in part be obvious and will in part appear hereafter.

We have found that in the reaction of a primary amine, secondary amine, tertiary amine and mixtures thereof with quaternizing agents, when a small amount of a color inhibiting agent such as hypophosphorous acid or one of its derivatives is added to the reaction system, the color of the final amine salt or quaternary ammonium salt product is greatly improved. We have found that when these amine salts and quaternary ammonium salts are so prepared, further purification steps are not required to improve and stabilize the color of the resulting product.

The steps involved in the practice of this invention are straightforward. An amine or mixtures of amines and a small amount of hypophosphorous acid are mixed together. The amine present in the resultant mixture is then treated with a quaternizing agent with or without heating. Heating of the reaction mixture depends on whatever reaction conditions are necessary to obtain the amine or quaternary ammonium salts being produced. These reaction conditions are well known to those skilled in the art and may be utilized in the practice of our invention.

The amount of hypophosphorous acid necessary for the prevention of color formaiton in the final amine salt or quaternary ammonium salt is usually a small amount. As illustrative of the present invention, hypophosphorous acid can be added to the amine in the form of a 50 percent by weight aqueous solution. It is usually employed in proportions of approximately 0.05 percent to 2.00 percent based on the total weight of the reactants including the quaternizing agent. Other strengths of hypophosphorous acid can also be used as for example 100 percent solid hypophosphorous acid. However, for convenience a 50 percent water solution is used. The preferred amount of hypophosphorous acid used is about 0.15 percent based on the total weight of the reactants. However, generally speaking, the amount of hypophosphorous acid to be used will depend somewhat on the amount of coloring material to be removed as well as on the conditions of operation and may be varied with satisfactory results. Quantities less than disclosed will produce noticeable improvements in color. Thus an improvement in the color of the amine salt or quaternary ammonium salt product will result when hypophosphorous acid is incorporated into alkylation systems because the formation of color has been inhibited, probably due to the reducing action of hypophosphorous acid.

We have also discovered that certain salts of hypophosphorous acid such as the sodium and the calcium salts of hypophosphorous acid can be used as color inhibiting agents in the process of our invention in place of the hypophosphorous acid itself. However, in the preferred embodiment of our invention hypophosphorous acid is utilized as the color inhibiting agent. Amine salts of hypophosphorous acid may also be used in place of hypophosphorous acid and in the practice of our invention such salts are formed when hypophosphorous acid is added to the amine which is being alkylated with quaternizing agents.

High concentrations of hypophosphorous acid at high reaction temperatures should be avoided, since on heating there is a progressive breakdown of the hypophosphorous acid to phosphoric acid and phosphine. The latter is a malodorous, poisonous and a spontaneously flammable gas. The breakdown of the acid is illustrated by the following equation:

$$2H_3PO_2 \rightarrow H_3PO_4 + PH_3$$

The amine compounds which are encompassed in our invention can be any organic compound containing an amino group and mixtures thereof, which group may be reacted with a quaternizing agent to form an ammonium salt compound. These compounds are well known in the art and our invention is not limited to the particular compound chosen or by its method of preparation.

Illustrative of tertiary amines which can be utilized in the process of our invention; trimethyl amine, triethanol amine, diethyl methylamine, dicoco methyl amine, tribenzyl amine, dimethyl ethanol amine, the condensate of cocoamine and 15 mols of ethylene oxide, the condensate of tallow amine and 5 mols of ethylene oxide, the condensate of stearyl amine and 18 mols of ethylene oxide, the condensate of oleyl amine and 9 mols of ethylene oxide, the condensate of methyl stearyl amine and 15 mols of ethylene oxide, the condensate of didodecyl amine and 10 mols of ethylene oxide, 4-lauryl pyridine, and methyl pyridine. Other amines which may be employed include 2,4-dimethyl pyridine, tetrakis N,N',N'',N'''-hydroxypropyl ethylene diamine, 2-heptadecenyl-1-hydroxy ethyl imidazoline, 1-stearamidoethyl-2-heptadecyl imidazoline, mixtures thereof and the like.

Illustrative of primary amines and secondary amines which can be utilized in the process of our invention to produce ammonium saltes and ultimately, if desired, quaternary ammonium salts, are, cocoamine, dicocoamine, coco methyl amine, lauryl hydroxyethyl amine, stearamide ethylene diamine, imino bis-proply amine, amylamine, methylethylamine, hexamethylene diamine, cyclohexylamine, dicyclohexylamine, anile, toluidine, diphenylamine, benzylyamine, benzidine, the oleic amide of hydroxy ethyl ethylene diamine, the stearic amide of hydroxyethyl ethylene diamine, N-stearoyl N'-acetyl diethylene triamine, the monooleamide of diethylene triamine, mixtures thereof and the like.

Quaternizing agents which react with amines to produce amine salts or quaternary ammonium salts are well known in the art and they include alkyl halides, aralkyl halides, alkyl sulfates, trialkyl phosphates, halo esters, sulfonic esters, mixtures thereof and the like. Illustrative of such compounds are methyl chloride, butyl bromide, ethyl bromide, ethyl iodide, benzyl chloride, dodecylbenzyl chloride, stearyl chloride, oleyl chloride, dimethyl sulfate, diethyl sulfate, triethyl phosphate, methyl chloroacetate, methyl-p-toluenesulfonate, ethylene chlorhydrin, epichlorohydrin, mixtures thereof and the like.

The procedures by which the amine and quaternary ammonium salts may be produced and to which our invention is applicable are well known in the art. That is our method of preparing amine and quaternary ammonium salts having improved color is applicable to any procedure for preparing the amine and quaternary ammonium salts. Regarding the reaction between primary, secondary and tertiary amines with quaternizing agents, a wide range of tempertures and proportions of reactants can be used. For example, some of these reactions may require heat, e.g. from 20° C to 100° C., while other reactions are highly exothermic and require cooling in order to prevent degradation of the reactants. Generally, in these processes the reactants are admixed in stoichiometric quantities. However, in some processes of producing quaternary ammonium salts, excess tertiary amine is employed and in others excess quaternizing agent will be employed. Further, in some processes the reactants are simultaneously mixed together, while in other processes one of the reactants is slowly added and admixed with the other. Our invention is not limited by the process of preparing the amine or quaternary ammonium salts of by the specific reactants and reaction conditions chosen to form these salts. Our invention may be efficiently utilized in preparing any amine salts and quaternary ammonium salts where it is desirable to obtain them free from discoloration.

As just indicated, the process disclosed in this invention is also applicable to reactions between quaternizing agents and primary and secondary amino compounds as well as tertiary amine compounds, since alkylation of these primary and secondary amines with a quaternizing agent produces a mixture of quaternary ammonium salts and secondary and tertiary amine salts. The alkylation reaction is essentially the same as a quaternization reaction and can be employed stepwise to convert a primary amine to a quaternary ammonium salt. The various methods of alkylating primary and secondary amines with quaternizing agents are well known to those skilled in the art and our invention is not to be limited by the particular method chosen to carry out the alkylation.

Thus, it must be understood that our invention is directed to preparation of amine salts and quaternary ammonium salts of improved color and our process can easily be adapted by those skilled in the art to any process for obtaining ammonium salts wherein primary amines, secondary amines, tertiary amines and mixtures thereof are reacted with a quaternizing agent to form a substituted ammonium salt compound. The various methods of preparation of amine salts and quaternary ammonium salt compounds are well known to those skilled in the art. Hence our invention is not to be limited to any specific reactant or process.

For a fuller understanding of the nature and objects of this invention, reference may be had to the following examples, which are given merely for purposes of illustrations and are not to be construed in a limiting sense.

In all examples, a control was carried out for comparative purposes. The control was perfomed in the same manner as the regular example except that the hypophosphorous acid, or one of its salts was not added to the reactants.

*Example I*

84 grams of distilled oleyl amine having a neutralization equivalent of 280 was mixed with 20 cc. of isopropanol and 0.12 gram sodium hypophosphite. This mixture was heated to 60° C. Then 37.8 grams of dimethyl sulfate was added dropwise to the mixture. The dropwise addition of the dimethyl sulfate was completed after 15 minutes had elapsed. The reaction between the oleyl amine and dimethyl sulfate was strongly exothermic and a cooling bath was employed during the addition of the dimethyl sulfate in order to maintain the temperature of the mixture between 80° C. and 100° C.

Upon completion of the addition of the dimethyl sulfate the mixture was heated at a temperature of 80° C. for a period of 30 minutes.

The color of the mixture thus prepared was compared with that of the control prepared for this example. The color of the mixture containing sodium hypophosphite produced in this example appeared much lighter than the control mixture which was prepared.

This example clearly illustrates the beneficial effects obtained in the production of an amine salt prepared by reacting a primary amine containing sodium hypophosphite with a quaternizing agent.

*Example II*

12 grams of 2-heptadecenyl-1-hydroxyethyl imidazoline, which was previously prepared from the reaction of oleic acid with hydroxyethylethylene diamine followed by purification through distillation, and 0.2 gram of 50 percent aqueous hypophosphorous acid solution were mixed together. This mixture was then heated to 60° C. and 5 grams of ethyl bromide was slowly added dropwise to the mixture. The reaction between the imidazoline compound of the ethyl bromide was strongly exothermic and the temperature of the mixture rose to 130° C. upon completion of the reaction. The mixture was then cooled to 20° C. and 10 cc. of isopropanol was added to the mixture to make it more fluid.

Comparison of this product with its control showed a distinct improvement in color when hypophosphorous acid was employed.

*Example III*

30 grams (0.108 mole) of 2-undecyl-1-hydroxyethyl imidazoline and 0.04 gram of 50% aqueous hypophosphorous acid solution were dissolved in 20 cc. of isopropanol. This mixture was then heated under reflux at 94° C. At this temperature 10 grams (0.108 mole) of epichlorhydrin was slowly dropped into the refluxing solution and the temperature held for 1.5 hours at 90-5° C. until reaction was essentially complete. The color of this product was definitely lighter than the control product which was made without the hypophosphorous acid addition.

*Example IV*

100 grams (0.168 mole) of 1-stearamidoethyl-2-heptadecyl imidazoline, having a neutralization equivalent of 595, together with 0.1 gram of 50% aqueous hypophosphorous acid solution were heated to 100° C. At this temperature 25.8 grams (0.168 mole) of diethyl sulfate was slowly added to the above mixture over a period of one hour, the heat of reaction maintaining the temperature. Upon completion of the diethyl sulfate addition, the temperature was maintained for an additional hour at 100° C. The color of the resulting product was light yellow whereas a dark brown product was obtained in the control example wherein the hypophosphorous acid was omitted.

*Example V*

58.2 grams (0.12 mole) of the tertiary amine produced by the addition of 5 moles of ethylene oxide to hydrogenated tallow amine was mixed with 4.0 grams of water and 0.1 gram of 50% aqueous hypophosphorous acid solution. This mixture was heated to 80° C. and 38.9 grams (0.13 mole) of dodecylbenzyl chloride added over a period of one hour, followed by heating for 4 hours at 100° C. This product was substantialy lighter in color than the control material which was prepared without the addition of hypophosphorous acid.

Examples II, III, IV and V clearly illustrate the beneficial results obtained when hypophosphorous acid is added to a tertiary amino compound during its alkylation with a quaternizing agent. The products prepared in these examples can readily be used as surfactants, dispersants and emulsifiers without need for any further color purification steps.

Having described our invention, what we claim as new and desire to secure by Letters Patent is:

1. In a process of reacting amines wtih quaternizing agents to obtain salts of improved color, the steps comprising adding from about 0.05 percent to about 2.00 percent by weight, based on the total weight of said amine and quaternizing agent of at least one color inhibiting agent selected from the group consisting of hypophosphorous acid, sodium hypophosphite and calcium hypophosphite to at least one amine, introducing at least one quaternizing agent to the mixture, reacting said amine and said quaternizing agent and thereafter recovering a substantially color free ammonium salt.

2. The process of claim 1, wherein said color inhibiting agent is hypophosphorous acid.

3. The process of claim 1, wherein said color inhibiting agent is sodium hypophosphite.

4. The process of claim 1, wherein said amine is a primary amine.

5. The process of claim 1, wherein said amine is a secondary amine.

6. The process of claim 1, wherein said amine is a tertiary amine.

7. In a process of reacting tertiary amines with quaternizing agents, the steps comprising adding from about 0.05 percent to about 2.0 percent by weight, based on the total weight of said tertiary amine and quaternizing agent of at least one color inhibiting agent selected from the group consisting of hypophosphorous acid, sodium hypophosphite and calcium hypophosphite to at least one tertiary amine, adding at least one quaternizing agent to the mixture, reacting said tertiary amine and said quaternizing agent, and thereafter recovering a substantially color free quaternary ammonium salt.

8. The process of claim 7, wherein said color inhibiting agent is hypophosphorous acid.

9. The process of claim 7, wherein said color inhibiting agent is sodium hypophosphite.

10. The process of claim 7, wherein said quaternizing agent is dodecyl benzyl chloride.

References Cited in the file of this patent

UNITED STATES PATENTS

| | | |
|---|---|---|
| 2,826,582 | Miller | Mar. 11, 1958 |
| 2,876,174 | Preston | Mar. 3, 1959 |
| 2,948,746 | Stuehmer et al. | Aug. 9, 1960 |

FOREIGN PATENTS

| | | |
|---|---|---|
| 492,457 | Canada | Apr. 28, 1953 |

OTHER REFERENCES

Morita et al., C.A., Vol. 51, pages 17026–17027 (1957).